Aug. 23, 1932.  W. F. BROWN  1,872,664
GLASS APPARATUS
Filed July 1, 1927
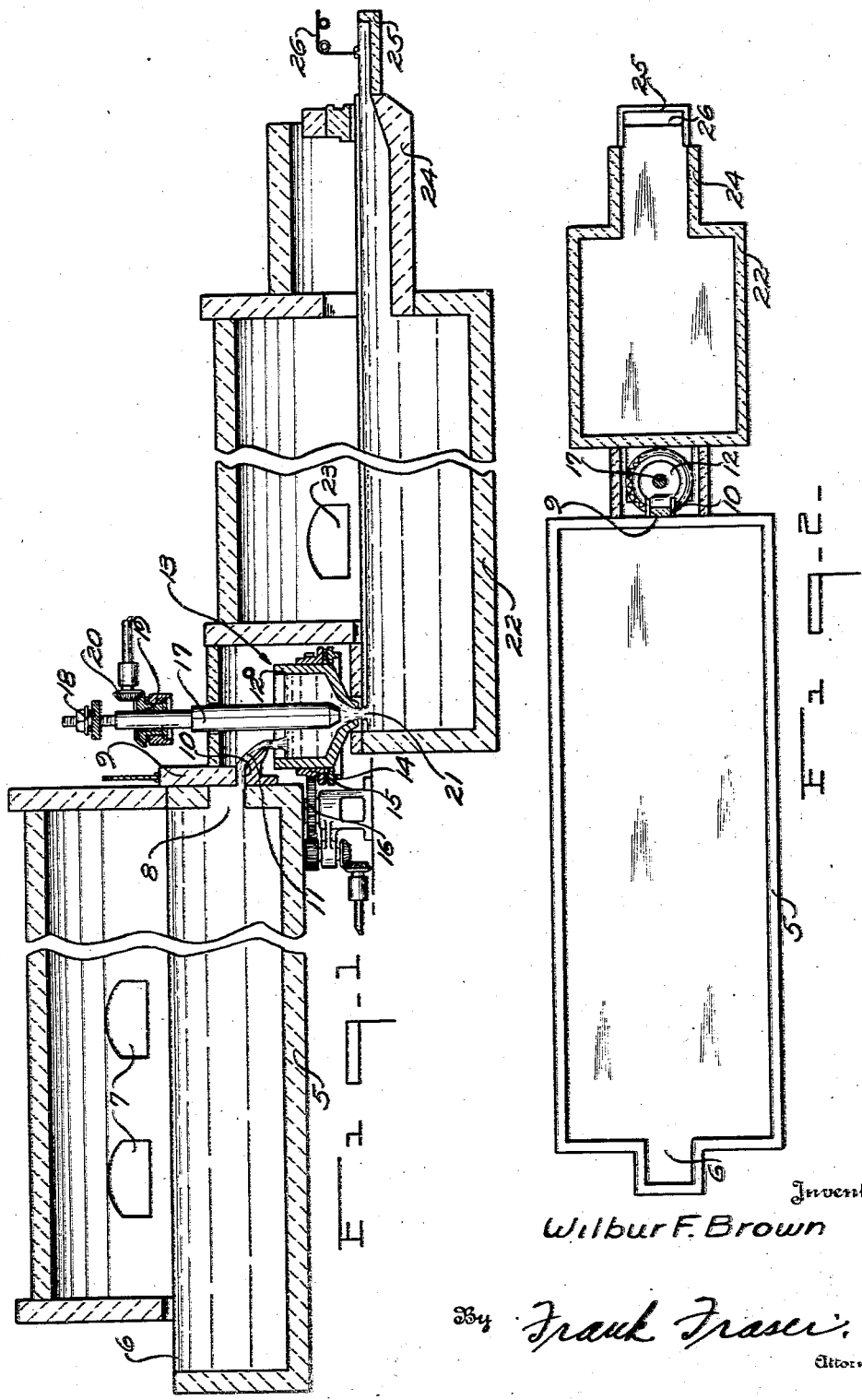
Inventor
Wilbur F. Brown
By Frank Fraser
Attorney Patented Aug. 23, 1932

1,872,664

UNITED STATES PATENT OFFICE

WILBUR F. BROWN, OF TOLEDO, OHIO, ASSIGNOR TO LIBBEY-OWENS-FORD GLASS COMPANY, OF TOLEDO, OHIO, A CORPORATION OF OHIO

GLASS APPARATUS

Application filed July 1, 1927. Serial No. 202,803.

The present invention relates to improvements in glass apparatus.

An important object of the invention is to provide in glass apparatus, an improved type of furnace.

Another important object of the invention is to provide in glass apparatus, an improved furnace including a melting tank, an agitating compartment, and a refining chamber.

Another object of the invention is to provide in glass apparatus, a furnace comprising a melting tank in which glass batch ingredients may be introduced to create molten glass, the molten glass then flowing into an agitating receptacle whereby the said molten glass is made perfectly homogeneous, the glass then flowing from the agitating receptacle into a refining chamber.

Another object of the invention is to provide in glass apparatus, an agitating receptacle being mounted for movement and having associated therewith an agitating member whereby all of the glass will be made homogeneous to remove cords, lines, smears, and other well known common glass defects.

Still another and important object of the invention is to provide in glass apparatus, an improved furnace comprising a melting tank, an agitating receptacle arranged below an outlet in one end of the melting tank, whereby the molten glass from said tank flows into the agitating receptacle where it is subjected to an agitation sufficient to remove common defects known in the glass art, whereby to make the glass homogeneous, the glass then flowing from said receptacle preferably through the bottom thereof where it is received in a refining chamber which may have connected therewith a working receptacle or receptacles.

Other objects and advantages of the invention will become more apparent during the course of the following description.

In the drawing wherein like numerals are employed to designate like parts throughout the same, Fig. 1 is a vertical longitudinal section through my improved furnace, and Fig. 2 is a diagrammatic plan view thereof.

Referring to the drawing, the numeral 5 designates the melting tank of my improved furnace. The tank is preferably provided with a dog-house 6 at one end in which may be introduced the glass batch ingredients. The ingredients are melted to produce molten glass by the action of regenerators 7. At the opposite end of the tank 5 is provided an outlet 8 having an adjustable closure member 9 cooperating with a discharge lip 10 to control a flow of glass 11 therefrom. The opening 8 is preferably such that sub-surface glass only will flow from the tank 5 so that the glass batch ingredients will be properly fused before leaving said tank.

The molten glass 11 flowing from the tank 5 is adapted to be received in an agitating compartment or receptacle 12 contained in a suitable heated compartment 13. The receptacle 12 is preferably adapted to be rotated, and to this end is supported on a suitable ring or the like 14 cooperating with a gear member 15 carried by said receptacle. Antifriction means may be interposed between the gear 15 and the supporting member 14. Drive gears 16 are connected to a suitable source of power and mesh with the gear 15 to rotate said receptacle, while the rotation of the receptacle may be controlled as desired. Adapted to cooperate with the rotary action of the receptacle 12 is a plunger or agitating member 17 adjustably supported by the means 18 and adapted to be driven by means of the gear 19 keyed to a portion of the member 17 and driven by power exerted through the gear 20. The agitating member 17 may either be rotated continuously in one direction or the other, or it may be oscillated first in one direction and then the other.

Arranged preferably in the bottom of the receptacle 12 is an outlet 21 through which the glass may discharge and be received in the refining chamber 22.

As shown, the molten glass flows from the tank 5 into the top of the receptacle, the glass then being subjected to an agitating action created by the combined movements of the member 17 and the receptacle 12. The member 17 and receptacle may be rotated simultaneously in the same direction or rotated in opposite directions. In fact, any combination of motions may be used to create the desired agitation of the glass.

Oftentimes smear, lines, and other defects are formed on the surface of the molten glass in the melting end of a tank. By using the present construction no care need be given to such formations in the melting tank as they will be completely removed in the agitating receptacle, while at the same time the glass will be made completely homogeneous in said receptacle.

After the glass has been agitated to make it homogeneous, it may be properly refined in the chamber 22 which may have heating means 23 associated therewith, if desired. After the glass has been allowed to properly refine and settle, it may be passed through a cooling chamber 24 and then into a working receptacle 25 from which a sheet 26 may be continuously drawn.

In the construction illustrated, it will be seen that the glass flows from one level, namely, the melting tank level, to a lower level into the agitating zone or receptacle, after which the glass flows into a still lower zone or level into the refining compartment 22.

By providing the agitating receptacle, melting of the glass is considerably simplified due to the fact that the melting fires can be operated with regard to the formation of smear, lines, etc. It is well known that smear, etc, are actually formed if the fires are not handled properly. In other words, in the usual tank furnace it is necessary to control the fires, not only in a manner to melt glass batch, but also with regard to the type of glass produced. This is considered a serious handicap.

With the present furnace, the fires in the melting tank can be handled to produce the best melting regardless of other things. This is possible because all smear, etc. will be completely removed by the agitation of the glass in the agitating receptacle. Not only will the smear, etc, be removed, but the glass leaving the agitating receptacle and entering the refining chamber will be absolutely homogeneous.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In glass apparatus, a furnace of the character described comprising a melting tank, a refining chamber, a rotatable agitating receptacle interposed therebetween, and a rotatable agitating member operable within said receptacle.

2. In glass apparatus, a furnace of the character described comprising a melting tank, a refining chamber, an agitating receptacle interposed therebetween, said agitating receptacle being rotatable about a substantially vertical axis and having an outlet opening substantially in the bottom thereof, and a rotatable agitating member operable within said receptacle.

3. In glass apparatus, a furnace of the character described comprising a melting tank, a refining chamber, a rotatable receptacle interposed therebetween, and a glass agitating device operable within said rotatable receptacle.

Signed at Toledo, in the county of Lucas and State of Ohio, this 28th day of June, 1927.

WILBUR F. BROWN.